United States Patent
Lyon

[11] 3,706,324
[45] Dec. 19, 1972

[54] SINGLE-HANDLE HIGH VOLUME TUB FILLER

[72] Inventor: John K. Lyon, Pasadena, Calif.

[73] Assignee: Price-Pfister Brass Mfg. Co., Pacoima, Calif.

[22] Filed: June 29, 1970

[21] Appl. No.: 50,776

[52] U.S. Cl............................................137/625.41
[51] Int. Cl.............................................F16k 11/00
[58] Field of Search.......137/625.41, 625.48, 625.42, 137/625.3, 625.28, 625.33, 625.17, 636.4, 625.68

[56] References Cited

UNITED STATES PATENTS

| | | | |
|---|---|---|---|
| 2,742,056 | 4/1956 | Williams | 137/625.68 |
| 3,105,519 | 10/1963 | Fraser | 137/625.17 |
| 3,415,280 | 10/1968 | Bucknell et al. | 137/625.17 |
| 3,189,048 | 6/1965 | Parker et al. | 137/625.41 X |
| 3,417,783 | 12/1968 | Manoogian et al. | 137/625.41 |
| 2,845,948 | 8/1958 | Parker | 137/625.41 X |
| 2,911,008 | 11/1959 | DuBois | 137/625.41 X |
| 3,192,939 | 7/1965 | Moen | 137/625.41 X |
| 3,269,413 | 8/1966 | Weaver | 137/625.41 X |
| 3,472,484 | 10/1969 | Parker | 137/625.41 X |
| 3,548,875 | 12/1970 | Lazarelli | 137/625.41 X |

Primary Examiner—Samuel Scott
Attorney—Flam and Flam

[57] ABSTRACT

A cup-shaped recess has four circularly arrayed ports, hot and cold inlet ports on opposite sides and two outlet ports in quadrature relationship. A valve post projects from and registers with the four ports. The post provides laterally opening hot and cold water openings at its outer end controlled by a cylindrical valve member, and at its outer end a pair of slots. The post has large passages establishing the requisite communication between the four ports, the hot and cold water valve-controlled openings and the slots.

3 Claims, 11 Drawing Figures

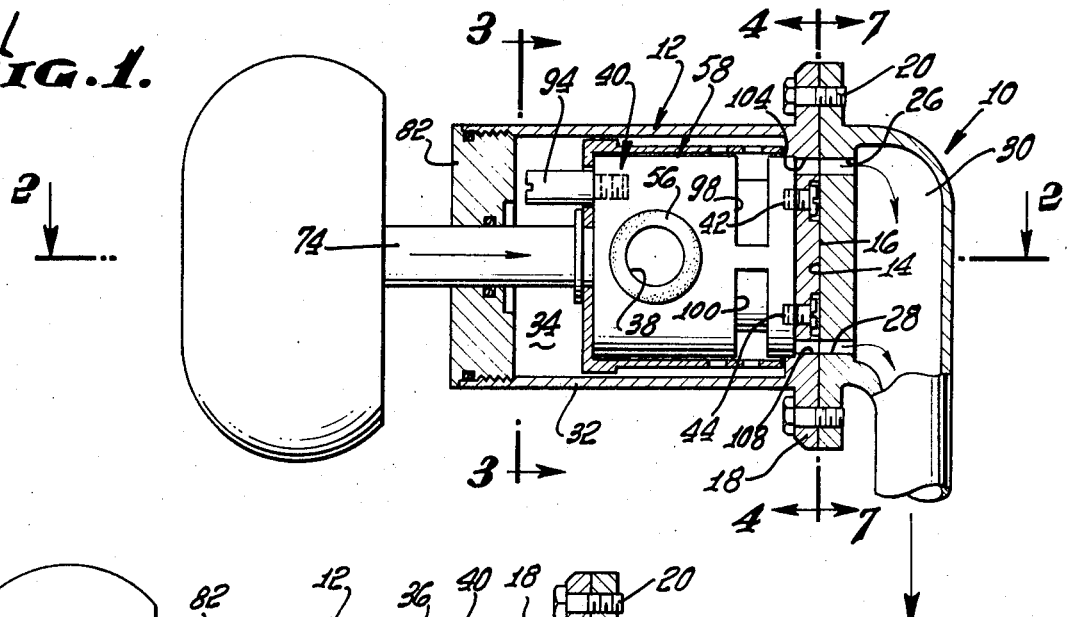
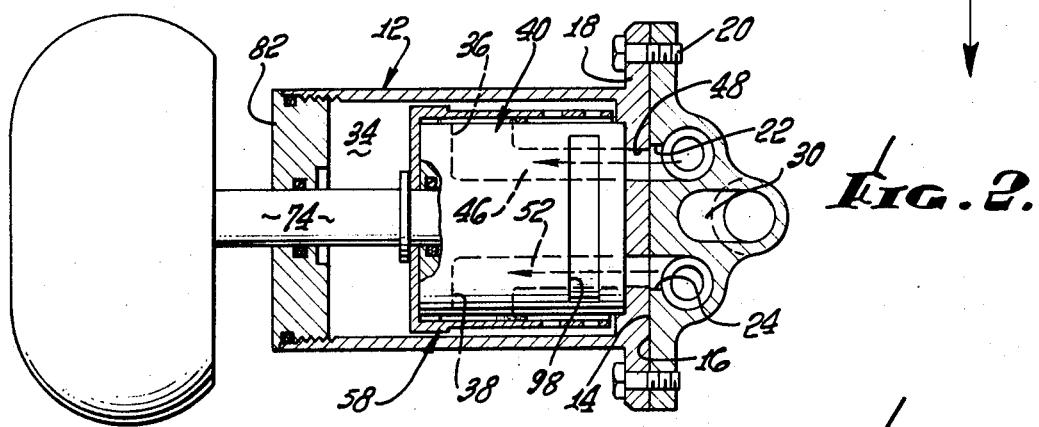
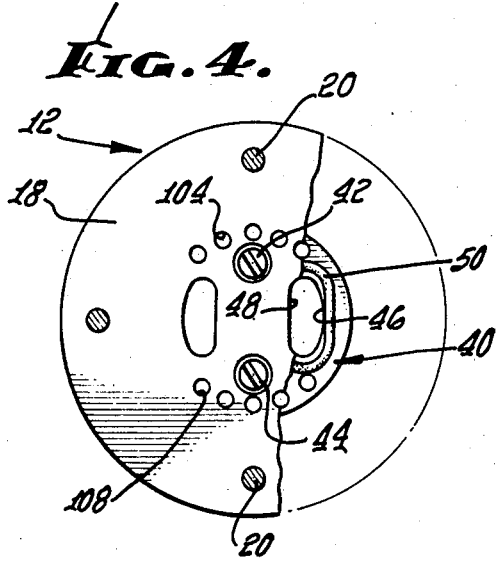
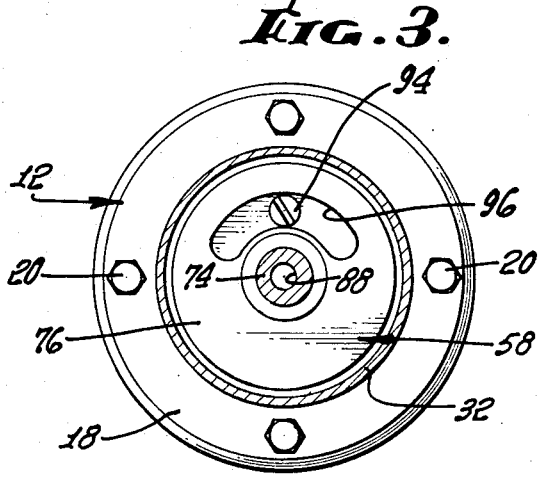
INVENTOR.
JOHN K. LYON
BY Flam and Flam
ATTORNEYS.

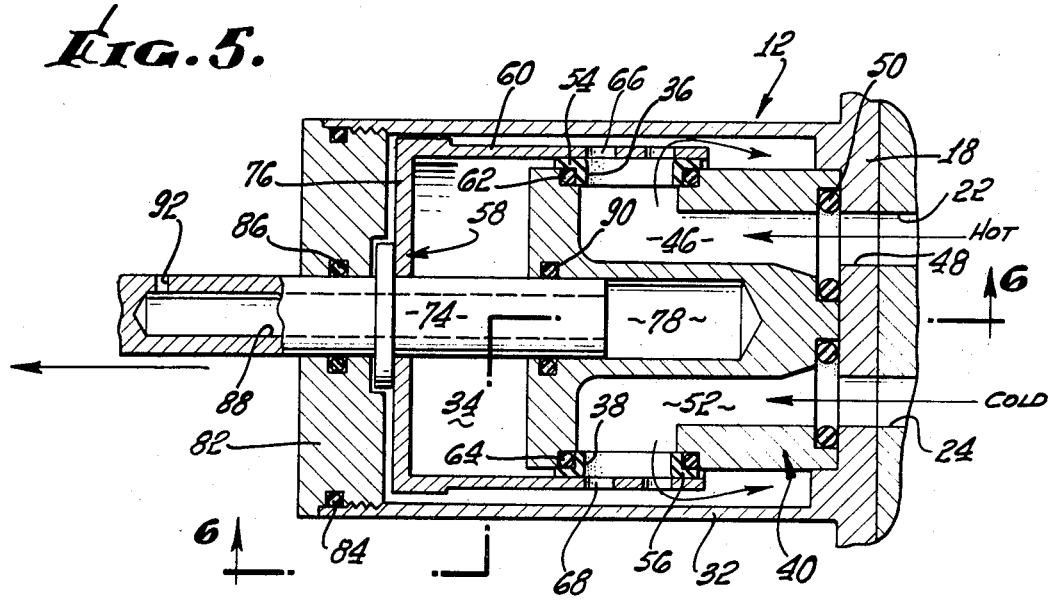
FIG. 5.
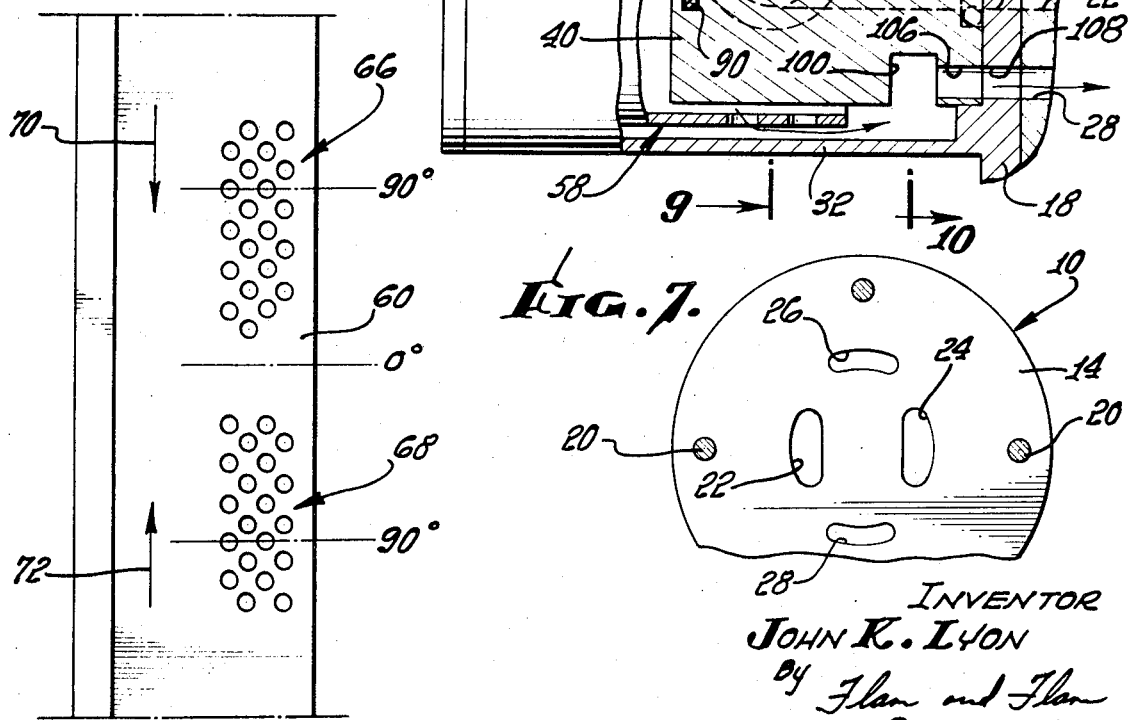
FIG. 6
FIG. 8.
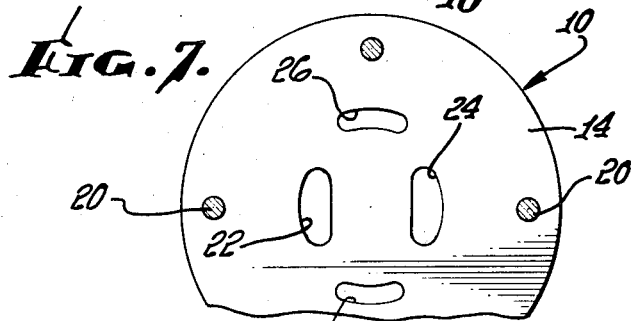
FIG. 7.
INVENTOR
JOHN K. LYON
BY Flam and Flam
ATTORNEYS.

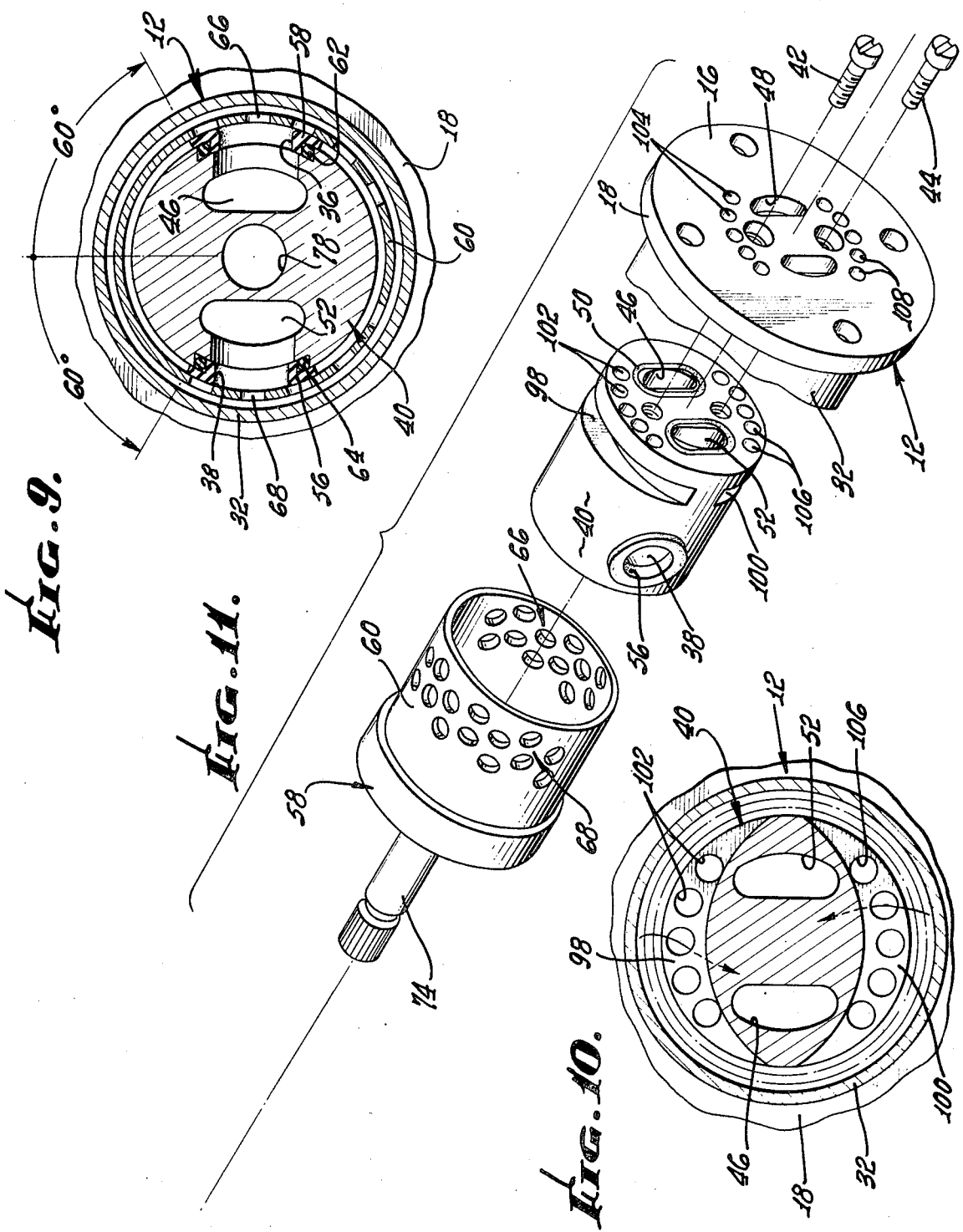

SINGLE-HANDLE HIGH VOLUME TUB FILLER

BACKGROUND OF THE INVENTION

This invention relates to single handled mixing valves and particularly to a mixing valve unit for remote control of water emitted by a shower head or tub spout.

A wide variety of such mixing valves now exist. Very few are capable of producing high flow rates of 7 to 8 gallons per minute, and those that do are usually quite bulky and expensive. In a typical prior art mixing valve, the inlets and outlets are formed by small circular openings, the outlet being located centrally or generally between the inlets. The ducting arrangement through the valve and to the outlet is necessarily small and tightly convoluted, resulting in substantial throttling.

The primary object of this invention is to provide a simple, compact, balanced mixing valve capable of producing a high flow rate.

BRIEF SUMMARY OF THE INVENTION

The foregoing object is accomplished by using a port arrangement in which two later merging outlet openings are located in quadrature relationship to the hot and cold water inlet ports, the ports being arrayed circularly. A valve post provides passages extending from the ports. The port provides two outwardly facing openings on opposite sides for hot and cold water respectively. An annular mixing chamber is defined between the valve post and a casing part. The post provides large slots communicating with the two outlet ports. An operating handle carries a sleeve that controls the hot and cold water openings. A simple vented recess arrangement provides pressure balance. All of the passages are located peripherally rather than centrally of the valve post and hence the passages can be large. There are no significant flow restrictions.

BRIEF DESCRIPTION OF THE DRAWINGS

A detailed description of the invention will be made with reference to the accompanying drawings. These drawings, unless described as diagrammatic or unless otherwise indicated, are to scale.

FIG. 1 is an axial sectional view of a mixing valve incorporating the present invention, the valve post being shown in elevation.

FIG. 2 is an axial sectional view taken along a plane corresponding to line 2—2 of FIG. 1.

FIG. 3 is a transverse sectional view taken along a plane corresponding to line 3—3 of FIG. 1 and showing the mechanism for determining limits to the angular movement of the valve member.

FIG. 4 is a sectional view taken along a plane corresponding to line 4—4 of FIG. 1, a portion of the apparatus being broken away to show the bottom of the valve post.

FIG. 5 is an enlarged axial sectional view of the valve structure, with the valve member shown in open position.

FIG. 6 is an offset sectional view taken along a plane corresponding to line 6—6 of FIG. 5.

FIG. 7 is a sectional view taken along a plane corresponding to line 7—7 of FIG. 1.

FIG. 8 is a cylindrical development of the valve member and showing the location of its openings.

FIGS. 9 and 10 are enlarged transverse sectional views taken along planes corresponding respectively to lines 9—9 and 10—10 of FIG. 6.

FIG. 11 is an exploded pictorial view of the components of the valve structure.

DETAILED DESCRIPTION

The following detailed description is of the best presently contemplated mode of carrying out the invention. This description is not to be taken in a limiting sense but is made merely for the purpose of illustrating the general principles of the invention since the scope of the invention is best defined by the appended claims.

The valve structure includes two castings 10 and 12 detachably clamped together. One of the castings 10 is installed in the wall and is designed to connect with supply pipes and pipes to the tub spout and/or shower head. The casting 10 provides an outwardly facing, flat, circular mounting surface 14.

The companion casting 12 is generally of cup shape. The outer surface 16 of the bottom wall 18 of the cup is placed against the mounting surface 14. The castings have flanges clamped together by screws 20. A protective cap can be placed over the surface 14 when the roughing-in is in progress. At a later stage in construction, the cap may be removed and the casting 12 affixed in place.

Opening on opposite sides of the mounting surface 14 (FIG. 7) are hot and cold water orifices or inlets 22 and 24 (see also FIG. 2). Fluid from the orifices 22 and 24 is controlled by a valve in the casting 12. The controlled fluid returns to top and bottom outlet orifices 26 and 28 (see also FIG. 1) in the mounting surface 14. These orifices 26 and 28 lead to a common chamber 30 in the casting 10. The chamber 30 communicates with a tub spout or shower head under the control of a suitable diverter valve, all in a conventional manner.

The finish casting 12 has a cylindrical part 32 projecting outwardly from the wall 18. The part 32 forms a mixing chamber 34.

The hot and cold water inlets 22 and 24 communicate with valve-controlled openings 36 and 38 (FIGS. 5 and 9) located on diametrically opposite sides of a valve post 40. The valve post 40 extends outwardly from the wall 18 and is secured thereto by the aid of a pair of countersunk screws 42 and 44 (FIGS. 1, 4 and 10). The valve post has an angled hot water passage 46 (FIG. 5). This passage has a large arcuate cross-sectional area for a large flow rate (FIGS. 9, 10 and 11). The end wall 18 of the casting 12 has an arcuate aperture 48 that establishes communication between the inlet 22 and the angled passage 46. A sealing O-ring 50 (see also FIG. 4) is accommodated in a counterbore surrounding the end of the angled passage 46. The transverse end of this passage is circular. A similar angled cold water passage 52 (FIG. 5) on the opposite side of the valve post 40 establishes communication between the cold water inlet 24 and the valve-controlled opening 38.

The openings 36 and 38 are defined by hat-shaped seat members 54 and 56. The seat members 54 and 56 have generally tubular parts extending axially into the circular transverse ends of the passages 46 and 52, and have radially outwardly extending flanges overlying the valve post 40.

Communication between the openings 36 and 38 and the valve chamber 34 is controlled by a valve member 58. The operative element of the valve member is a cylindrical part 60 that telescopes over the valve post 40 and the seat members 54 and 56. O-rings 62 and 64 fit the seat members 54 and 56 and provide suitable seals.

As shown in FIG. 8, the cylindrical valve part 60 has two sets of perforations 66 and 68, one for the hot water opening 36 and the other for the cold water opening 38. The axial span of the sets is slightly greater than that of the openings 36 and 38. When the valve member 58 is pulled to its outer limit as shown in FIGS. 5 and 6, the sets of perforations are axially aligned with the openings for maximum flow. In this axial position, both valve post openings 36 and 38 may be fully open due to the arcuate span of the perforation sets. This neutral, full ON position is shown in FIG. 5. Upon angular movement of the valve member 58 in one direction, as indicated by the arrow 70, the of perforations 66 for the hot opening moves out of registry with the valve post opening 36 while the full registry yet exists for the cold opening. Maximum flow is achieved as the mixture becomes cooler due to throttling action of the hot water opening. Correspondingly, upon movement of the valve member in the opposite direction, as indicated by the arrow 72, the mix becomes hotter due only to throttling of the cold water opening. Combined flow is reduced by inward axial movement of the valve member.

The valve member is connected to an operating stem 74 by a spider or wall 76. The inner end of the stem 74 fits a recess 78 in the valve post 40, and the outer end of the stem 74 projects through a plug 82 threadedly fitted to the outer end of the casting 12. An O-ring 84 seals the periphery of the plug to the casting 12. A second O-ring 86 seals the plug 82 to the stem 74.

In order to provide pressure balance, the valve post recess 78 is vented through an axial opening 88 in the stem 74. An O-ring 90, mounted in an interior annular groove of the valve post 40, seals the stem to the valve post at the outer end of the post recess 78. A radial port 92 at the outer end of the stem vents the recess 78 to atmosphere. Hydraulic forces on the valve member 58 are at all times in balance, and there is no tendency for the valve member to move in either axial direction.

In order to determine the limits to the angular movement of the valve member, the valve post 40 carries a pin 94 that projects through an arcuate recess 96 in the end wall 76 in the valve member 58.

The mixed water entering the chamber 34 is received in two arcuate slots 98 and 100 (FIGS. 6 and 11) at the base of the valve post 40. These arcuate slots 98 and 100 are located in quadrature relationship to the hot and cold water inlet passages 46 and 52 and are quite large. The valve post has a series of arcuately arrayed apertures 102 (see FIGS. 10 and 11) that connect the slot 98 to correspondingly arcuately arrayed openings 104 (FIG. 6) in the bottom wall 18 of the casting 12 and thence to the arcuate outlet opening 26 (FIG. 6) in the casting 10. A similar series of openings 106 are provided to connect the other slot 100 to arcuately arrayed openings 108 in the bottom wall of the casting 12 and thence to the outlet opening 28 of the casting 10.

By virtue of the peripheral location of the valve member, the ports that conduct the hot and cold water to the chamber 34 and the ducts that conduct the water from the chamber 34 are all of a substantial size, and a high volume mixing valve is provided despite its compact size.

Intending to claim all novel, useful and unobvious features shown or described, I make the following claims:

1. In a mixing valve structure:
   a. valve casting means for a tub filler, shower head, tub filler/shower head combination or other remote outlet installation, said casting means having a substantially cup-shaped recess, there being four openings at the bottom surface of the recess, namely, two substantially diametrically located hot and cold water inlet ports and two substantially diametrically located outlet ports, said ports being substantially circularly arrayed;
   b. a valve post immovably attached to said casting means and having a peripheral surface spaced from and thus defining with the inside of said cup, a mixing chamber, said valve post being recessed to expose said outlet ports for direct passage of water thereto from said mixing chamber; and
   c. a movable valve member telescoped over said valve post and surrounding said valve openings, said valve member having openings registrable with said valve openings of said post member to control proportion by angular movement of said valve member and to control volume by axial movement of said valve member, said valve member being interposed between said post and the said inside of said cup and being spaced from said inside of said cup, said valve member being movable outwardly of the post to open said valve, said valve member in open position allowing unrestricted communication between said mixing chamber and the recessed portion of said valve post.

2. The mixing valve as set forth in claim 1 together with an operating rod connected to said valve member, said operating rod having a cylindrical end extending into a recess in said valve post, and having a cylindrical part extending through the end wall of said mixing valve chamber, said cylindrical part and said cylindrical end being of the same size; first sealing means operative between said recess and said rod end during axial movement of said rod; second sealing means operative between said end wall and said cylindrical part; and a vent extending through said rod to the end thereof and opening on the outside of the end wall whereby said valve member is hydraulically balanced.

3. In a mixing valve structure:
   a. a valve casting for a tub filler, shower head, tub filler/shower head combination or other remote outlet installation, said casting having at least three separate conduits for hot water, cold water and for mixed hot and cold water;
   b. a valve post immovably attached to or forming a part of said casting and having a peripheral surface at which at least three openings are located forming the ends of said conduits;
   c. said openings of said valve post being angularly displaced from each other; and d. a movable valve member telescoped over said valve post to surround said inlets and and having openings registrable with said valve post openings to control proportion by angular movement of said valve member and to control volume by axial movement of said valve member, said valve member exposing the opening for said outlet opening when the valve member is in open position.

* * * * *